Figure 1:
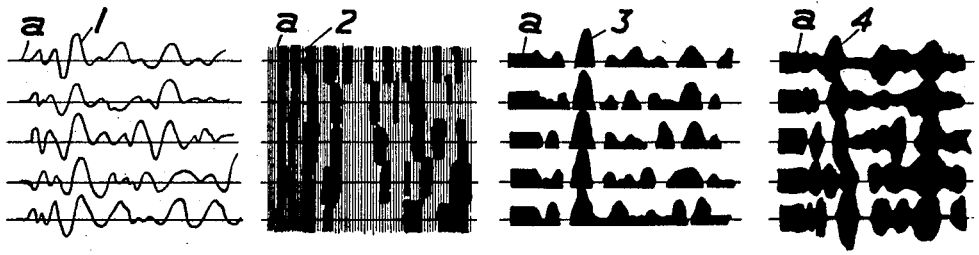

March 16, 1965     K. WEISSENSTEINER     3,173,743
REPRESENTATION OF SEISMOGRAMS
Filed March 19, 1962     3 Sheets-Sheet 1

March 16, 1965  K. WEISSENSTEINER  3,173,743
REPRESENTATION OF SEISMOGRAMS
Filed March 19, 1962  3 Sheets-Sheet 2

INVENTOR
Karl Weissensteiner
BY
Stevens, Davis, Miller & Mosher
ATTORNEYS

March 16, 1965  K. WEISSENSTEINER  3,173,743
REPRESENTATION OF SEISMOGRAMS
Filed March 19, 1962  3 Sheets-Sheet 3

INVENTOR
Karl Weissensteiner
BY
Stevens, Davis, Miller & Mosher
ATTORNEYS

United States Patent Office 3,173,743
Patented Mar. 16, 1965

3,173,743
REPRESENTATION OF SEISMOGRAMS
Karl Weissensteiner, Ahlem, near Hannover, Germany, assignor to Prakla Gesellschaft für praktische Lagerstattenforschung G.m.b.H., Hannover, Germany
Filed Mar. 19, 1962, Ser. No. 180,895
Claims priority, application Germany, Mar. 24, 1961,
P 26,824
4 Claims. (Cl. 346—33)

The invention relates to a method and to a device for the representation of seismograms in various kinds of graphs known as line graph, density graph, symmetrical and asymmetrical area graph, respectively.

The various kinds of graph are used in geophysics to an ever-increasing extent for facilitating the interpretation of seismograms. The device hitherto known for the conversion of reproducibly recorded line-oscillograms into other kinds of representation operated generally with optical-mechanical arrangements, which were constructed each for a certain kind of conversion. For example it is known to reproduce a line oscillogram as an asymmetrical graph thereby that half of the beam of light directed on a galvanometer mirror is screened off, so that on a film moved past without a signal being applied a black-and-white strip is produced, the dividing line of which lies between black and white in the middle of the trace. When a course of electrical oscillations is applied to the galvanometer coil corresponding for example to a seismic signal, a corresponding deflection of the galvanometer mirror occurs, so that then a course of oscillations is recorded, the lower half of which is blackened.

Other known devices use movable grey wedges, which are inserted into the path of the light for producing a recording of variable density. With other devices scintillations corresponding with the null passages of the course of oscillations are generated for example by excess control and limitation, so that on the recording paper a studded graph is formed which consists of blackened rectangles of variable width. The kind of representation by studs, density or area graph, better suited for certain evaluations is partly conditioned by a better emphasis on the null passages than in ordinary amplitude graphs, so that conformity between the individual traces of one or more seismographs can be ascertained more readily.

It is moreover known to represent in a cathode ray oscillograph oscillation phenomena in X—Y-co-ordinates, and to record the images obtained photographically. Apart from the representation of seismic signals on one or more traces of an oscillograph by applying a time base voltage it has finally also become known, to control the electron beam in the manner of scanning the grid lines of a television image and to reproduce the individual traces of a seismogram by a corresponding brilliance control of the beam. This method yields a very badly focused image, since on the one hand the grid lines decide the definition, while on the other hand the size of the screen image cannot be chosen at will.

Since the manner of representation most favourable for a special task of geological occurrences depends on the problems and on the sensing instruments used, it is desirable to have a universal simple reproducing device, by means of which by simple change-over any manner of representation desired can be produced, a sharp image allowing accurate evaluation being formed.

The device according to the invention solves this problem thereby that a light-sensitive or electrostatically influenceable film is pulled past an electron beam tube, the beam of which is deflected only in one co-ordinate perpendicular to the direction of movement of the film, and is modulated in the strength in accordance with the manner of representation chosen. Thereby an optical reduction in size is made possible, so that a sharp image is obtained. The simplest modulation obtained is that for an amplitude graph by applying the signal voltage directly to the vertical plates. For producing the other manners of representation, an alternating voltage or sequence of impulses is applied to the vertical plates which is of a high frequency as compared with the signal oscillation to be recorded. For producing a density graph the signal voltage is connected to a grid of the electron beam tube in such a manner that a corresponding modulation of the strength of the beam occurs, while for an area graph the strength of the beam is changed over from bright to dark depending on the amplitude of the signal voltage applied at any time for corresponding sections of the high frequency impulse series applied to the vertical plates. Conveniently, for the purpose of further simplification of the device several circuit elements or groups thereof are used in common for the individual manners of representation so that the change-over from one manner of representation to another merely requires the actuating of a single switch.

Figure 3:
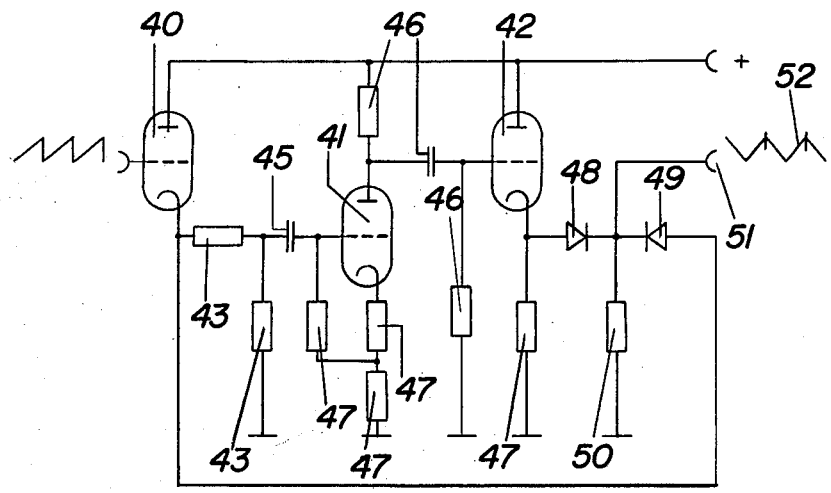
Figure 2:
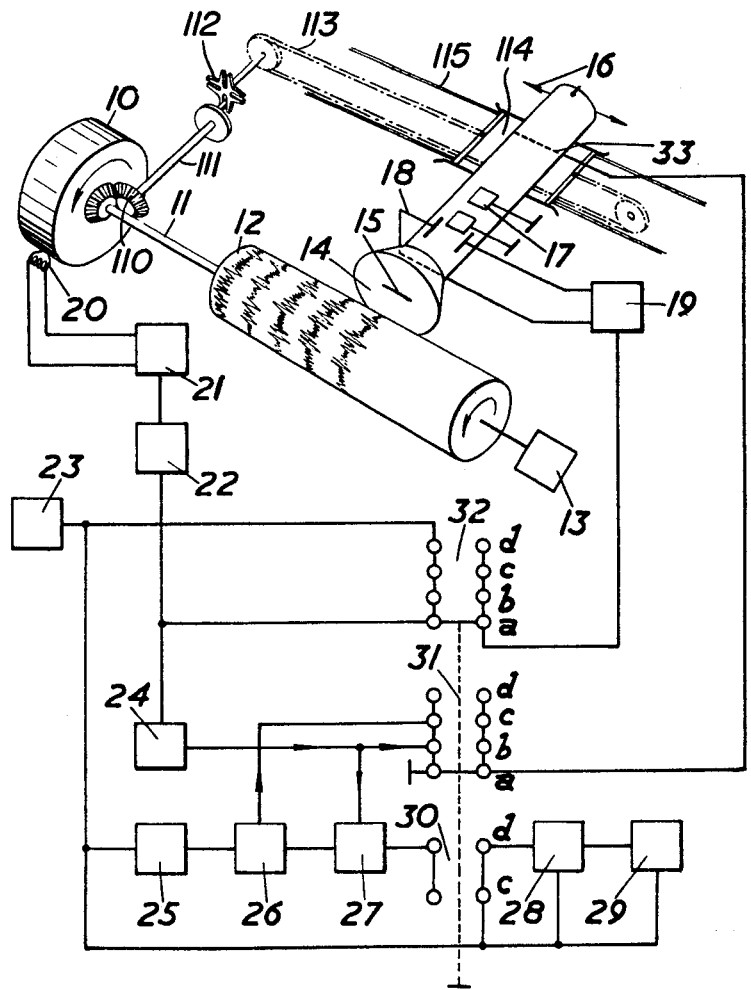
Figure 4:
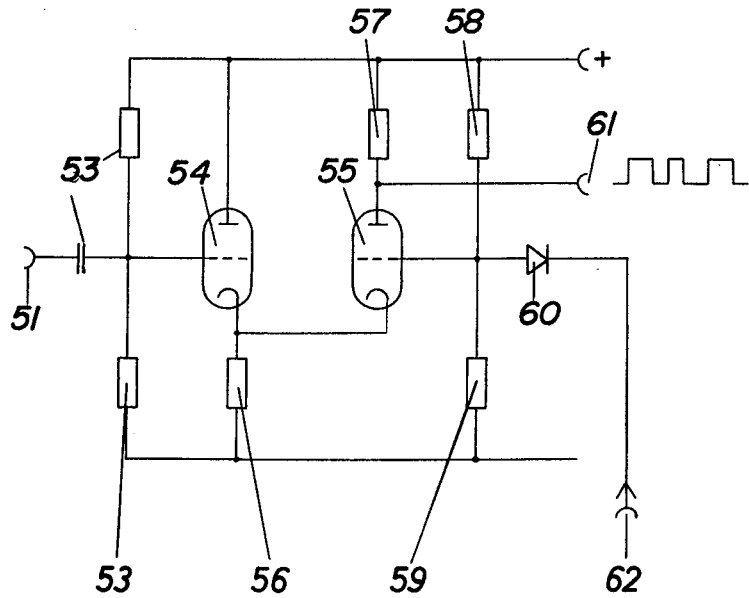

Further features and details of the invention will become apparent from the description of an embodiment given by way of example with reference to the accompanying drawings, in which:

FIG. 1 is a comparative synopsis of parts of a seismogram in the various manners of representation, FIG. 2 is a diagrammatic illustration of the device according to the invention with a block circuit diagram, FIG. 3 is a circuit diagram of the arrangement for the generation of triangular signals, and for voltage comparison, and FIG. 4 is a circuit diagram of the arrangement for voltage comparison.

In the synopsis of the various manners of representation of the seismogram in FIG. 1, the different emphasis of individual characteristics of the recording is clearly visible. The usual seismogram 1 obtained for example as an amplitude graph by recording on photo-sensitive paper by means of mirror galvanometers is distinguished by an accurate reproduction of the individual courses of sound waves received, but naturally the emphasis of the characteristic parts suffers thereby. Without a signal, the amplitude graph consists merely of straight lines $a$, generated on photo-sensitive paper as the trace of the light spot projected by the mirror galvanometer standing in the null position, or in the present case by the non-deflected cathode ray beam.

In the density graph 2 a medium brightness value corresponds to the no-signal position $a$, while the courses of sound waves 2 produce in proportion to their amplitudes, a corresponding blackening for positive amplitudes, and on the other hand for negative amplitudes a corresponding brightening of the actual trace of the density graph. Conveniently the width of each record trace is so chosen that a complete covering of the seismogram results. Since the spacing of one trace from the others is adjustable in accordance with the actual distances of the geophone groups on the site, an adaptation of the width of the recording trace may be carried out from one recording to another. From the example illustrated it will be seen that the density graph 2 is particularly suitable for discovering the major characteristics, since oscillations of minor amplitude make themselves little noted in the overall picture.

The representation of a seismogram as an asymmetrical area graph 3 results in a very strong optical definition of the oscillations appearing simultaneously on all traces, owing to the sharp black-and-white boundary and the narrow spacing of the traces in practice, since in this case these oscillations extend across the seismogram as a blackened sharply delimited band 3.

Conveniently the null line is not placed directly at the margin of the trace band but, say, at the first quarter of the band, so that with small amplitudes of the oscillations also the negative half-values are recorded.

Finally the symmetrical area graph 4 counts amongst the most frequently used manners of representation of seismograms. In the no-signal condition then a black band is reproduced lying symmetrically of the null-line, which band is amplitude-modulated in width by the oscillation to be represented. This manner of representation contains, apart from a clear visibility of simultaneously occurring courses of oscillation of great amplitude, a full information about courses of oscillation of small amplitude.

In FIG. 2 the device according to the invention is illustrated in conjunction with a magnetic tape unit. On a common shaft 11 driven by a motor 13 at constant speed, a magnetic tape drum 10, a film drum 12 and a gearing (described later) are mounted, which after each revolution shifts a cathode ray tube 14 in juxtaposition with the film drum 12, as well as a transducer head 20 by the width of one recording in the axial direction 16 relative to the film drum 12. On the magnetic tape drum 10 a magnetic tape is clamped in the usual manner, on which for example a seismogram of twenty four traces is recorded. The transducer head 20 senses at each revolution of the drum one trace of the seismograph. The signal derived from the transducer head appears, after passing through an amplifier 21, at the output of a demodulator 22 as a low frequency seismic signal.

The aforesaid gearing may consist for example of a pair of meshing bevel gears 110, a lay shaft 111 driving a Geneva-cross mechanism 112 and a chain drive 113 pulling a slide 114 carrying the cathode ray oscillograph tube 14 in guide rails 115 against the bias of a spring one step at each revolution of the shaft 111. When the whole of the magnetic tape on the drum 10 has been sensed by the transducer head 20, the slide 114 is returned to its starting position manually or automatically by any conventional release means.

The Y-deflecting plates 17 of the cathode ray tube 14 are earthed, while the X-deflecting plates 18 are connected to the output of a push-pull amplifier 19. The grid 33 is connected with one contact row $a$, $b$, $c$, $d$ of a switch 31, while the input of the push-pull amplifier 19 is connected with the corresponding row of contacts of a switch 32.

A saw tooth voltage generator 23 having a frequency of for example $3 \times 10^3$ cycles per second, which is high as compared with the frequency of the seismic signal to be recorded of for example 200 cycles per second, is directly connected with one part of the contacts of the switch 32. Moreover the saw tooth voltage is supplied to a phase reversing stage 29, to an OR-gate 28 and to an impulse generator 25. From the demodulator 22 the seismic signal is passed to the $a$-contact of the row of contacts 32 and to a cathode follower stage 24, from where it is passed to the $b$-contact of the row of contacts 31. Moreover the seismic signal may reach a voltage-comparator 27, the other input of which is connected with the $c$-and $d$-contacts of the row of contacts 30. A flip-flop stage 26 finally is connected with the $c$-contact of the row of contacts 31.

For generating a line graph 1 the switch of the row of contacts 30, 31, 32 is set to the $a$-contacts. Thereby the grid 33 of the cathode ray tube is earthed over the contact 31$a$, so that the electron beam flows at a constant intensity. The magnetic trace scanned by the transducer head 20 on the magnetic tape drum 10 is transmitted after pre-amplification and demodulation as a low frequency voltage via the contact 32$a$ to the push-pull amplifier 19 and hence to the horizontal pair of plates 18. The light spot 15 accordingly oscillates horizontally about its middle position in the rhythm of the low frequency, and thus illuminates the light-sensitive paper pulled past the cathode ray screen in the form of a line graph. After each revolution of the shaft 11 the transducer head 10 and the cathode ray oscillograph 14 are adjusted the width of one trace in the axial direction, so that the next recording may take place.

For producing the density graph 2 the rows of contacts 31 and 32 are set to the contacts $b$. The grid 33 of the cathode ray tube 14 receives the low-frequency seismic signal via the contact 31$b$, while the saw tooth voltage of comparatively higher frequency of the generator 23 and of predetermined amplitude acts on the horizontal deflecting plates 18. The brilliance of the light spot 15 is then so adjusted that in the no-signal condition a medium grey is formed on the film 12. By brilliance modulation of the grid 33 a graph of variable density is produced, the width of recording of which is determined by the amplitude of the saw tooth voltage generator 23.

In the position of the switch 30, 31 and 32 on the contacts $c$ the device produces a seismogram recording as an asymmetrical area graph. On the deflector plates 18 then lies the saw tooth voltage of the generator 23, so that the target point 15 of the electron beam is likewise on a straight line. The brilliance of the line 15 is determined by the voltage applied to the grid 33. The saw tooth voltage of the generator reaches through the contact 30$c$ the voltage comparator 27, wherein a comparison with the signal voltage takes place in such a manner that an output impulse is delivered at the moment when both voltages are equal. The output impulse is passed to the input of a bi-stable flip-flop circuit 26 which by this impulse is brought into the other stable position. The flip-flop circuit 26 remains in this position until it is restored to the initial position by an impulse derived from the impulse generator 25 from the drop of the saw tooth voltage. From the bi-stable circuit stage a signal is passed through the contact 31$c$ to the grid 33, which lets the electron beam flow any time from the end of the saw tooth impulse (restoration) up to the change-over of the bi-stable stage by the voltage-equality impulse of the comparator stage 27.

Accordingly on the film a representation is produced as an asymmetrical area graph by the electron beam flowing at any time up to a point of the saw tooth voltage corresponding to the amplitude applied. By appropriate choice of the comparative bias voltage of the comparator stage 27 it can moreover be attained that the signal level of zero volt corresponds to a boundary line 3$a$ which lies above the basis of the actual trace, so that even minor negative amplitudes of the signal voltage are completely reproduced.

Instead of the use of a bi-stable flip-flop circuit 26 the voltage comparator circuit may alternatively be so designed that, as shown in the example of FIG. 4, directly a corresponding square impulse is generated.

Finally in the switch position 30$d$, 31$d$ and 32$d$ the device produces a symmetrical area graph. As regards the function and manner of operation of the elements connected with the rows of contacts 31 and 32, there is no difference from the case of asymmetrical area graph described hereinabove. However, a triangular periodical impulse is now fed through the contact 30$d$ to the voltage comparator circuit 27. This impulse is generated by an OR-gate 28 into which the saw tooth voltage from the generator 23 is fed directly and, through the phase reversing stage 29 is fed with a complementary course. Hence on the output of the OR-gate a symmetrical triangle is generated as the form of impulse. The voltage comparator stage then yields a positive or negative impulse any time equality of voltage is reached between the seismic signal and one of the branches of the triangular signal respectively, which through the bi-stable stage determines the duration of switching on the electron beam on its deflection course 15.

In the circuit diagram as shown in FIG. 3 for the generation of a symmetrical triangular voltage impulse, which for deriving the symmetrical area graph is passed as a reference voltage to the voltage comparator stage, two cathode follower stages 40 and 42 and a phase-reversing stage 41 are connected with an OR-gate 48, 49. The cathode follower stage 40 is connected through a voltage-divider 43 with the grid combination 44, 45 of the phase-reversing stage 41 the alternating anode voltage of which is fed through the coupling 46 into the second cathode follower stage 42. The outputs of the cathode follower stages 40 and 42 are connected each through a diode 48 and 49, respectively to the output 51 of the OR-gate. The cathodes of the diodes 48 and 49 are finally earthed through a resistor 50.

A saw tooth voltage fed into the grid of the valve 40 is passed on the one hand directly from the cathode to the anode of the rectifier 49, on the other hand through the voltage divider 43 and the coupling condenser 45 to the grid of the phase-reversing stage 41.

Through the coupling consisting of the anode impedance and the grid combination 46 a saw tooth oscillation complementary to the input saw tooth oscillation is fed into the cathode follower stage 42 and gets from the cathode impedance 47 thereof to the anode of the diode 48.

Be it first assumed, that the voltages applied to the anodes of the diodes 48 and 49 are equal and positive. Then the potential of the output terminal 51 is likewise equal to the voltage applied to the diodes, since both diodes are conductive. This condition corresponds approximately to the middle of the rising flank of the input saw tooth voltage, and to the lower peak of the output triangular voltage. When the saw tooth voltage rises further, also the positive voltage of the diode 49 rises, while the voltage applied to the diode 48 drops complementarily. The output terminal 51 then has the positive potential applied to the diode 49, while the diode 48 is blocked. At the end of the rising blank of the saw tooth voltage, accordingly the potential at the output terminal 51 has risen to its maximum through the conductive diode 49. The saw tooth voltage should have as steep as possible a drop, since from this flank a triangular output signal is generated although strongly compressed in time, which in the alternating output voltage illustrated is indicated as a small needle impulse 52. By suitably dimensioning the saw tooth generator this disturbance impulse can however be reduced to negligibly small magnitudes, so that as regards illumination of the film by the cathode ray tube it has no effect any more. In the linear rising part of the saw tooth voltage following the steep drop, owing to the reversal, the voltage occurring at the cathode of the valve 42 is higher than the voltage applied to the anode of the diode 49, so that in the sloping-down part of the triangular output voltage the diode 48 is conductive at any time. As soon as the amplitude of the saw tooth voltage has risen to the mean value, the blocking of the diode 48 and unblocking of the diode 49 occurs again.

The symmetrical triangular oscillation occurring on the terminal 51 is fed into the voltage comparator circuit diagrammatically illustrated in FIG. 4, which consists of two cathode-coupled triodes 54–55, of which that valve only at any time can be conductive, the grid voltage of which is positive. The grid of the valve 54 receives a positive bias voltage from the coupling combination 53, which voltage is selected approximately equal to the voltage fed via the resistors 58 and 59 to the grid of the valve 55, so that with a signal applied from 51, the conductivity alternates between both valves at equal intervals. Owing to the capacitor 53 the change-over point of conductivity lies accurately on the middle of the linear portions of the voltage from 51. On the anode impedance 57 accordingly square impulses are generated, the width of which is equal to the spacing of the middles of the linear portions of the voltage from 51. These square impulses are fed on to the Wehnelt-cylinder of the cathode ray tube 14, the X-plates of which are fed with the saw tooth voltage used for deriving the triangular voltage from 51, so that about 50% of the rising flank of the saw tooth is reproduced, namely the part lying symmetrically of the middle of the flank. In this manner the band 4a according to FIG. 1 is recorded on a film which is drawn past.

The grid of the valve 55 is supplied through the diode 62 with the seismic signal, which is of low frequency as compared with the signal applied to the terminal 51. Thereby the point of change-over of the conductivity between the two valves will travel along the flanks of the signal from 51 in accordance with the momentary amplitude of the seismic signal 51, so that, depending on the instantaneous amplitude, square impulses of shorter or longer duration can be derived from the terminal 61. Accordingly by conversion in the cathode ray tube an image is recorded as a symmetrical area graph on the illuminated film corresponding to the seismic signal applied.

Instead of a light-sensitive paper, alternatively simply an electrically insulating paper may be used, when letting the electron beam emerge through a Lenard window, so that on the paper an electrostatic charge pattern is formed which may be made permanently visible, for example by applying a powder and fixing the same with a xero-developer powder.

While I have described herein and illustrated in the accompanying drawings what may be considered a typical and particularly useful embodiment of my said invention I wish it to be understood that I do not limit myself to the particular details and dimensions described and illustrated; for obvious modifications will occur to a person skilled in the art.

What I claim as my invention and desire to secure by Letters Patent is:

1. An apparatus for displaying a train of seismic oscillations as an asymmetrical area graph, comprising in combination: a cathode ray tube, a film movable past said cathode ray tube and influenceable by the cathode ray beam emitted by the latter, a source of a signal voltage corresponding to said seismic oscillations, a source of a reference voltage of saw tooth wave form and of a frequency of a higher order of magnitude than that of said signal voltage, said cathode ray tube having means connected with said source of saw tooth wave form voltage capable of deflecting its electron beam in the direction perpendicular to the direction of said film only, a voltage comparator electrically connected both with said source of signal voltage and said source of reference voltage and in operation delivering an impulse any time the voltages of both said sources are equal, in such a manner that the length of path of deflection of said electron beam corresponding to the instantaneous magnitude of said signal voltage, said electron beam is unblocked.

2. An apparatus for displaying a train of seismic oscillations as an asymmetrical area and as a symmetrical area graph respectively comprising in combination: a cathode ray tube, a film movable past said cathode ray tube and influenceable by the cathode ray beam emitted by the latter, said cathode ray tube having means for deflecting its cathode ray beam in a direction perpendicular to the movement of said film only and means for controlling the intensity of said beam, a source of signal voltage of a magnitude corresponding to said seismic oscillations, a source of a reference voltage of a frequency of a higher order of magnitude than that of said signal voltage, a voltage comparator electrically connected both with said source of signal voltage and said source of reference voltage and in operation comparing the magnitudes of said two voltages, said voltage comparator being electrically connected with said means for controlling the intensity of said cathode ray and from said voltage comparison deriving signals controlling the intensity of said electron beam; the deflection of said electron beam being controlled by said source of reference voltage.

3. An apparatus for displaying a train of seismic oscillations as a symmetrical area graph comprising in combination: a cathode ray tube, a film movable past said cathode ray tube and influenceable by the cathode ray beam emitted by the latter said cathode ray tube having means for deflecting its cathode ray beam in a direction perpendicular to the movement of the said film only and means for controlling the intensity of said beam, a source of signal voltage of a magnitude corresponding to said seismic oscillations, a source of a reference voltage of symmetrical triangular wave form and of a frequency of a higher order of magnitude than that of said signal voltage, a voltage comparator electrically connected with both said source of signal voltage and said source of reference voltage and in operation comparing the magnitudes of said two voltages, means for synchronizing said reference voltage with the voltage deflecting said electron beam, and said means for controlling the intensity of said electron beam being electrically connected with said voltage comparator, impulses derived from the voltage magnitude comparison of said two voltage sources alternately blocking and unblocking said electron beam when said two voltages are of equal magnitude.

4. An apparatus for displaying a train of seismic oscillations as asymmetrical and symmetrical area graphs respectively comprising in combination: a first rotatable drum having a magnetizable tape mounted thereon for recording seismic oscillations, a second drum having mounted thereon a recording film influenceable by the beam of cathode ray and connected to the said first drum for rotation therewith, a cathode ray tube directed radially towards said second drum, stepwise acting gearing connecting said cathode ray tube with said drums and in operation moving said cathode ray tube axially relative to said second drum one step for each revolution of said drums, a transducer head in juxtaposition with said first drum and in operation scanning said magnetizable tape, and electric circuit means connecting said transducer head with said cathode ray tube and in operation controlling its electron beam emitted towards said film in accordance with the seismic oscillations recorded on said magnetizable tape, said electric circuit means comprising a saw-tooth voltage generator, a phase reversing stage connected with said generator, and OR-gate having one input connected with said generator and another input connected with said phase-reversing stage, and an output producing a voltage of symmetrical triangular wave form, a voltage comparator having an input connected with said transducer head, another input adapted to be electrically connected with said saw-tooth wave form voltage generator and with said source of symmetrical triangular wave form voltage respectively, and an output electrically connected with said cathode ray tube and in operation controlling the intensity of the electron beam thereof, the deflection of said electron beam being controlled by said saw tooth wave form voltage generator.

References Cited by the Examiner
UNITED STATES PATENTS

| | | | |
|---|---|---|---|
| 2,950,459 | 8/60 | Loper et al. | 356—33 X |
| 2,986,722 | 5/61 | Williams | 346—33 X |
| 3,025,123 | 3/62 | Klein | 346—33 X |
| 3,047,836 | 7/62 | Johnson et al. | 340—15.5 |

LEO SMILOW, *Primary Examiner.*